(12) United States Patent
Lal et al.

(10) Patent No.: US 9,432,214 B2
(45) Date of Patent: Aug. 30, 2016

(54) LOAD PANEL INCLUDING AN AGGREGATOR COMPONENT AND A NUMBER OF ELECTRICAL SWITCHING APPARATUS ASSIGNING UNIQUE ADDRESSES THERETO

(71) Applicant: EATON CORPORATION, Cleveland, OH (US)

(72) Inventors: Dhananjay Lal, Seven Fields, PA (US); Abhay Raosaheb Shinde, Pune (IN); Jason K. A. Okerman, Moon Township, PA (US)

(73) Assignee: EATON CORPORATION, Cleveland, OH (US)

( * ) Notice: Subject to any disclaimer, the term of this patent is extended or adjusted under 35 U.S.C. 154(b) by 614 days.

(21) Appl. No.: 13/894,541

(22) Filed: May 15, 2013

(65) Prior Publication Data
US 2014/0340822 A1    Nov. 20, 2014

(51) Int. Cl.
*H02B 1/04* (2006.01)
*H04L 12/50* (2006.01)
(Continued)

(52) U.S. Cl.
CPC ............... *H04L 12/50* (2013.01); *H02B 1/04* (2013.01); *H02H 7/0822* (2013.01); *H02H 3/006* (2013.01)

(58) Field of Classification Search
CPC ............ H03K 17/962; H03K 17/945; H03K 17/955; H03K 17/9645; H05B 39/085; H02B 1/04; H02H 7/0822; H02H 3/006; H02J 13/0013; H04L 12/50
USPC ........................................................ 307/116
See application file for complete search history.

(56) References Cited

U.S. PATENT DOCUMENTS 3,401,395 A * 9/1968 Neher ..................... G06F 11/34
                                                    324/113
5,315,531 A * 5/1994 Oravetz ............... G01R 21/133
                                                    324/142
(Continued)

FOREIGN PATENT DOCUMENTS

DE    10 2005 014 124 A1    9/2006

OTHER PUBLICATIONS

European Patent Office, "International Search Report and Written Opinion", Aug. 21, 2014, 9 pp.

*Primary Examiner* — Thienvu Tran
*Assistant Examiner* — Brian K Baxter
(74) *Attorney, Agent, or Firm* — Eckert Seamans Cherin & Mellott, LLC; Nathaniel C. Wilks; Grant E. Coffield

(57) ABSTRACT

A load panel includes an enclosure; an aggregator having a first processor and a number of communicating mechanisms; and a number of circuit breakers. The first processor includes a first routine communicating using the number of communicating mechanisms. Each of the number of circuit breakers includes a second processor, and first and second communicating mechanisms. The aggregator and the number of circuit breakers are arranged as a linear structure within the load panel. The second processor includes a second routine communicating using the first and second communicating mechanisms and assigning a unique address to a corresponding one of the number of circuit breakers with respect to the aggregator and any remaining number of the number of circuit breakers. The first communicating mechanism communicates with or toward the aggregator. The second communicating mechanism communicates with at most one of the any remaining number of the number of circuit breakers.

25 Claims, 4 Drawing Sheets

(51) Int. Cl.
  *H02H 7/08* (2006.01)
  *H02H 3/00* (2006.01)

(56) References Cited

U.S. PATENT DOCUMENTS

| | | | |
|---|---|---|---|
| 5,861,683 A * | 1/1999 | Engel | G01R 19/2513 |
| | | | 307/147 |
| 6,055,144 A | 4/2000 | Reid | |
| 6,292,717 B1 * | 9/2001 | Alexander | G01R 19/2513 |
| | | | 340/6.1 |
| 2007/0064360 A1 | 3/2007 | DeBoer et al. | |
| 2007/0067132 A1 * | 3/2007 | Tziouvaras | H02H 3/006 |
| | | | 702/122 |
| 2007/0188954 A1 * | 8/2007 | Wiese | H02H 3/006 |
| | | | 361/62 |
| 2011/0282507 A1 * | 11/2011 | Oudalov | H04B 3/54 |
| | | | 700/292 |
| 2012/0126851 A1 * | 5/2012 | Kelem | G06F 15/7867 |
| | | | 326/38 |
| 2014/0189230 A1 * | 7/2014 | Wang | G11C 11/40615 |
| | | | 711/106 |

* cited by examiner

LOAD PANEL INCLUDING AN AGGREGATOR COMPONENT AND A NUMBER OF ELECTRICAL SWITCHING APPARATUS ASSIGNING UNIQUE ADDRESSES THERETO

BACKGROUND

1. Field

The disclosed concept pertains generally to load panels and, more particularly, to load panels including a number of circuit breakers.

2. Background Information

A load panel, such as, for example, a panelboard, load center or circuit breaker panel, holds a plurality of electrical switching apparatus each of which is connected between a power source and a separate load.

Electrical switching apparatus include, for example, circuit switching devices and circuit interrupters, such as circuit breakers, contactors, motor starters and motor controllers. Circuit breakers are generally old and well known in the art. Such circuit breakers are used to protect electrical circuitry from damage due to an overcurrent condition, such as an overload condition or a relatively high level short circuit condition.

It is known to employ a controller, such as for example a computer, for controlling a plurality of circuit breakers in a panelboard. It is also known to employ the controller to monitor the status of the circuit breakers in a panelboard from the status contacts thereof.

It is further known to provide a panelboard for up to a fixed number (e.g., 42) of circuit breakers. In the event that fewer than such fixed number of circuit breakers are required, then a smaller number of circuit breakers are employed in the fixed size panelboard. It is also known to provide a plurality of different panelboard styles for up to a fixed number (e.g., without limitation, 2, 4, 6, 8, 10, 12, 16, 20, 24, 42) of circuit breakers, with a first circuit breaker typically located in the upper left portion of each panelboard style. However, typically, each of the different panelboard styles requires a different set of connections between the controller and each different fixed number of circuit breakers.

Known methods of assigning addresses for network communication to circuit breakers in load panels include the use and maintenance of routing tables and/or factory programming of an address in non-volatile memory (e.g., without limitation, circuit breaker EEPROM; FRAM) or dual inline package (DIP) switches.

There is room for improvement in load panels for electrical switching apparatus.

SUMMARY

These needs and others are met by embodiments of the disclosed concept in which each of a number of electrical switching apparatus of a load panel include a processor, a first communicating mechanism and a second communicating mechanism. An aggregator component of the load panel and the number of electrical switching apparatus are arranged as a linear structure within the load panel. The processor includes a routine structured to communicate using the first and second communicating mechanisms and to assign a unique address to a corresponding one of the number of electrical switching apparatus with respect to the aggregator component and any remaining number of the number of electrical switching apparatus.

In accordance with one aspect of the disclosed concept, a load panel comprises: an enclosure; an aggregator component including a first processor and a number of communicating mechanisms, the first processor including a first routine structured to communicate using the number of communicating mechanisms; and a number of electrical switching apparatus, each of the number of electrical switching apparatus including a second processor, a first communicating mechanism and a second communicating mechanism, the aggregator component and the number of electrical switching apparatus being arranged as a linear structure within the load panel, the second processor including a second routine structured to communicate using the first and second communicating mechanisms and to assign a unique address to a corresponding one of the number of electrical switching apparatus with respect to the aggregator component and any remaining number of the number of electrical switching apparatus, the first communicating mechanism communicating with or toward the aggregator component, the second communicating mechanism communicating with at most one of the any remaining number of the number of electrical switching apparatus.

As another aspect of the disclosed concept, a load panel comprises: an enclosure; an aggregator component including a first processor and two communicating mechanisms, the first processor including a first routine structured to communicate using the two communicating mechanisms; and a plurality of electrical switching apparatus, each of the electrical switching apparatus including a second processor, a first communicating mechanism and a second communicating mechanism, the aggregator component and the electrical switching apparatus being arranged as two linear structures within the load panel, the second processor including a second routine structured to communicate using the first and second communicating mechanisms and to assign a unique address to a corresponding one of the electrical switching apparatus with respect to the aggregator component and any remaining number of the electrical switching apparatus, the first communicating mechanism communicating with or toward the aggregator component, the second communicating mechanism communicating with at most one of the any remaining number of the electrical switching apparatus.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a controller; a workstation; a personal computer; a microprocessor; a microcontroller; a microcomputer; a central processing unit; a mainframe computer; a mini-computer; a server; a networked processor; or any suitable processing device or apparatus.

As employed herein, the term "load panel" shall mean a load center, a panelboard, a circuit breaker panel, or any suitable enclosure enclosing or housing a number of electrical switching apparatus for a number of branch or other load circuits.

As employed herein, the statement that two or more parts are "connected" or "coupled" together shall mean that the parts are joined together either directly or joined through one or more intermediate parts.

Figure 1:
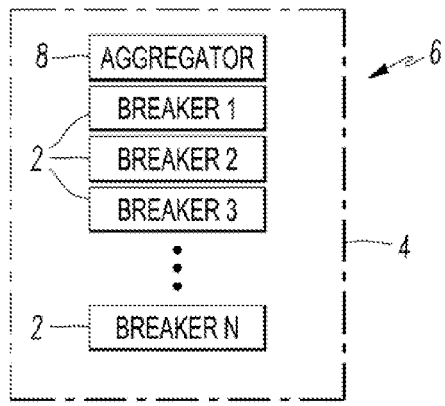
FIG. 1 is a block diagram of a plurality of circuit breakers in a load panel as stacked adjacent to each other along with an aggregator in accordance with an embodiment of the disclosed concept.

Referring to FIG. 1, a plurality of electrical switching apparatus, such as the example circuit breakers 2, are disposed in an enclosure 4 of a load panel 6 and are stacked adjacent to each other along with an aggregator 8. The disclosed concept provides an addressing mechanism for a linear structure (hereinafter "linear stack") of communicating electrical switching apparatus within a load panel. Also referring to FIG. 2, each of the circuit breakers, such as 10, includes two communicating ports or communicating interfaces 12,14 (e.g., without limitation, on either side of the circuit breaker 10), as will be discussed. The disclosed concept employs the inherently linear structure of a typical configuration of electrical switching apparatus within a load panel to assign addresses such that each electrical switching apparatus is assigned a unique address and there is no requirement for maintenance of routing tables. In essence, the disclosed concept uses the inherent network topology to define the network routing since the network address of an electrical switching apparatus also denotes its position in the linear stack. Furthermore, this helps to remove the need of having a fixed address assigned to each electrical switching apparatus in the load panel and can execute without the need for factory programming of an address in non-volatile memory (e.g., without limitation, circuit breaker EEPROM).

The addressing mechanism of the disclosed concept functions regardless of the order of installation of the circuit breakers 2 within the load panel 6, and adjusts to re-assign network addresses if the topology changes due to the removal, addition or replacement of a circuit breaker. The execution of the addressing mechanism is transparent to an installer and an end user, who do not need to intervene in any manner.

The addressing mechanism assumes the presence of a special node (e.g., the example aggregator 8) which plays a special role in address allocation and can also be responsible for communicating data and messages between the load panel 6 and the outside world through a suitable communication channel (not shown).

Figure 2:
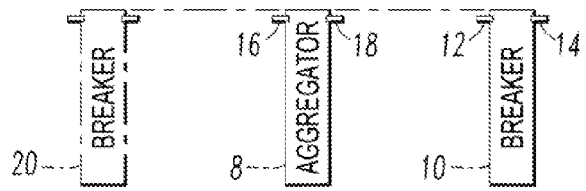
FIG. 2 is a block diagram of an aggregator and a circuit breaker each of which communicates with adjacent devices in a load panel through two interfaces in accordance with an embodiment of the disclosed concept.

As shown in FIG. 2, the aggregator 8 includes a number of communicating ports or communicating interfaces 16,18 (e.g., without limitation, on either side of the aggregator 8), which can function in a manner similar to the circuit breaker communicating interfaces 12,14. If there are two communicating interfaces 16,18 (as shown), the aggregator 8 and the circuit breaker 10 can communicate with adjacent devices through two interfaces. For example, the aggregator 8 and the circuit breaker 10 can communicate with each other through the interfaces 18 and 12, respectively. If the aggregator 8, like the circuit breaker 10, has the two interfaces 16,18, then it can communicate with two independent linear stacks of circuit breakers (e.g., a first stack including the circuit breaker 10 as shown, and a second stack including the circuit breaker 20 (as shown in phantom line drawing).

Figure 3:
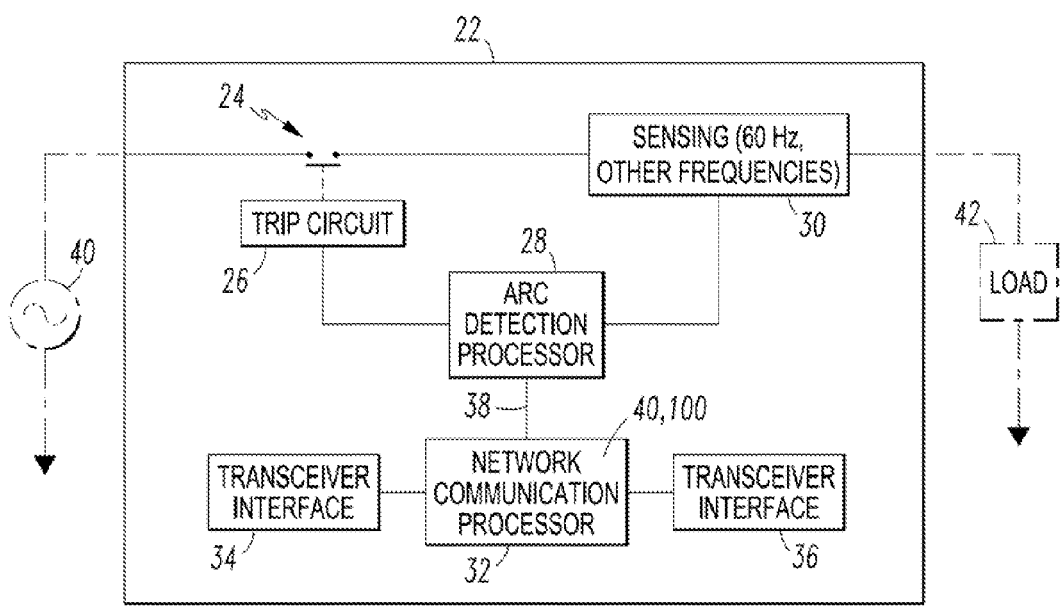
FIG. 3 is a block diagram of a circuit breaker in accordance with an embodiment of the disclosed concept.

FIG. 3 shows a circuit breaker 22, which can be used in the load panel 6 of FIG. 1. The circuit breaker 22 includes separable contacts 24 controlled by an operating mechanism and/or trip circuit 26, an example arc detection processor 28 and a sensing circuit (e.g., without limitation, 60 Hz; other suitable frequencies) 30 in series with the separable contacts 24. The circuit breaker 22 also includes a network communication processor 32 that communicates using a first transceiver interface 34 and a second transceiver interface 36. The network communication processor 32 can communicate with the arc detection processor 28 using a suitable serial communication interface 38. The circuit breaker 22 is electrically connected with the separable contacts 24 between a power source 40 (e.g., without limitation, 120 VAC, 60 Hz) (shown in phantom line drawing) and a load 42 (shown in phantom line drawing).

For the addressing mechanism of the disclosed concept, an address is, for example and without limitation, an 8-bit number that is appropriately assigned to a circuit breaker after the disclosed dynamic addressing mechanism is complete. In hexadecimal notation, for example, the address is written as 0xNN (where N is a 4-bit "nibble" number). In decimal notation, for example, it is an unsigned integer number between 0 and 255. Since the aggregator 8 can communicate with one or two independent linear stacks of the circuit breakers 2, there could, in this example, be up to 510 (=255×2) circuit breakers in the load panel. Alternatively, there could be one linear stack of up to 255 of the circuit breakers 2 in the load panel, or there could be one linear stack of up to 127 of the circuit breakers 2 in the load panel (e.g., having even addresses 2, 4, 6, . . . 252, 254) and one linear stack of up to 127 of the circuit breakers 2 in the load panel (e.g., having odd addresses 3, 5, 7, . . . 253, 255). However, it will be appreciated that the example addresses are not limited to 8-bit numbers and that a wide range of integer numbers can be employed.

In one example embodiment, whenever the aggregator 8 is turned on, it assigns itself address "0". After installation and startup, each circuit breaker 2 assigns itself a default address 0xFF (or decimal 255), as will be discussed in greater detail, below.

In order to have meaningful communication between the aggregator 8 and each of the circuit breakers 2, each of the circuit breakers 2 in the linear array of circuit breakers needs to have a unique integer number as its address. The aggregator 8 needs to associate every address with the functionality of the corresponding circuit breaker 2. The former step is described herein. After this step has executed, every circuit breaker in the linear array of circuit breakers has a unique integer number as its address. Although not part of the disclosed concept, each circuit breaker 2 may provide "meta-data" to the aggregator 8 in order to identify its function and the type of information it intends to send or receive. This constitutes the latter step, which is not further described herein.

Whenever one of the circuit breakers 2 is turned on, it runs an addressing mechanism to acquire a unique and valid address. The circuit breaker 2 will save the unique and valid address until it is powered off and, if powered on, it will acquire a unique and valid address by requesting a re-run of the addressing mechanism. In the process of execution of the addressing mechanism, each of the circuit breakers 2 develops an understanding of its own example 8-bit address, as well as develops the ability to route a message intended for a different address/circuit breaker.

This dynamic addressing mechanism is further discussed in connection with Examples 1 and 2 and respective FIGS. 4 and 5A-5B.

The disclosed concept is independent of the order in which different circuit breakers 2 are brought online, and accommodates any changes in topology due to removal, addition and/or replacement (i.e., one circuit breaker is removed and is immediately replaced by another circuit breaker) of any of the circuit breakers 2 by dynamically re-initiating address allocation.

EXAMPLE 1

Figure 4:
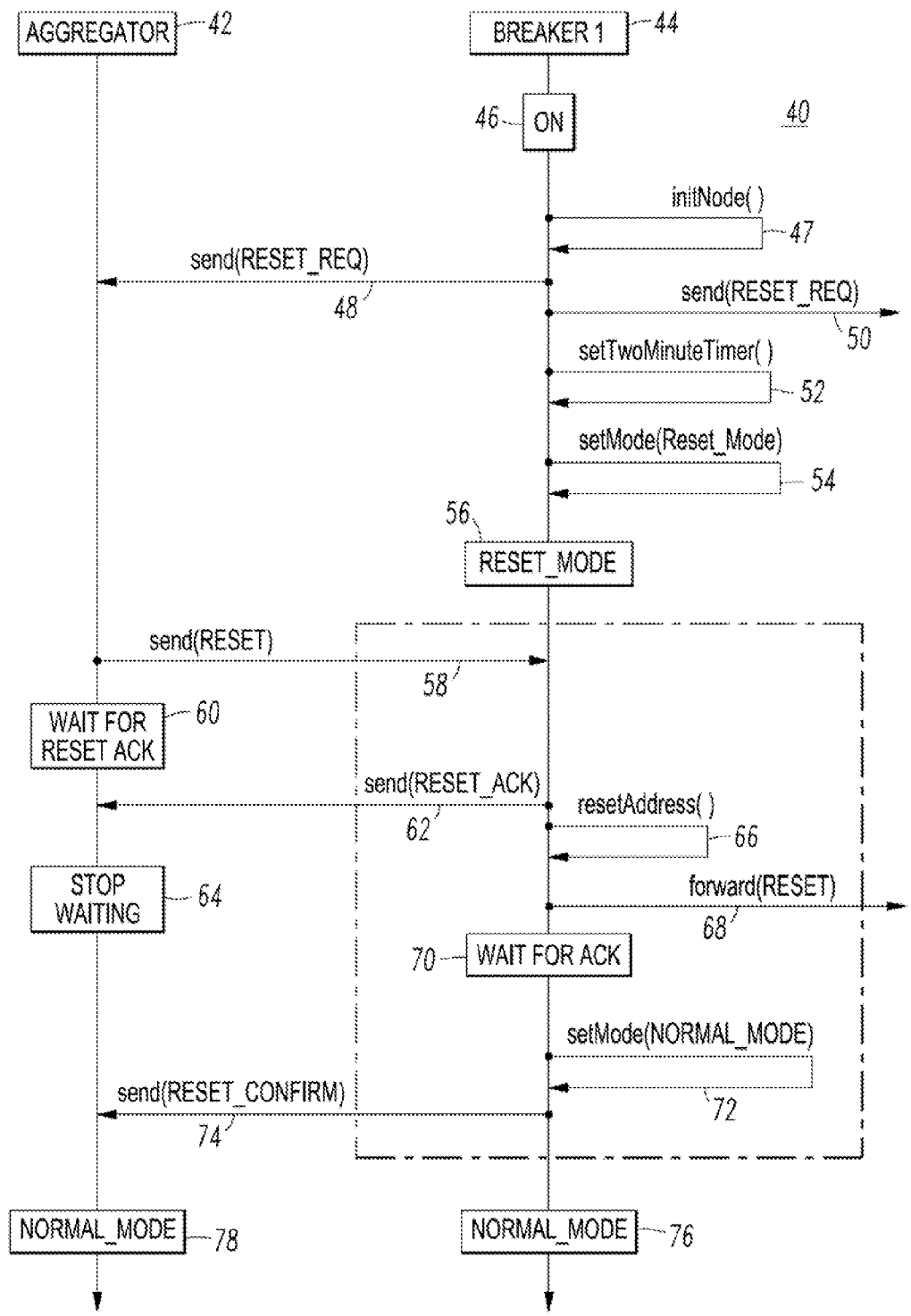
FIG. 4 is a communication sequence diagram of an example configuration including the aggregator and the circuit breaker of FIG. 1.

FIG. 4 shows a sequence diagram 40 for an example configuration including an aggregator 42 and one circuit breaker 44. Aspects of the sequence diagrams 40,100 of FIGS. 4 and 5A-5B are executed as routines by the network communication processor 32 of FIG. 3 as part of either the aggregator 8 or the circuit breaker 2 of FIG. 1. A typical input condition is that the aggregator 42 is turned on before the circuit breaker 44. For example and without limitation, the aggregator 42 can be a main circuit breaker and the circuit breaker 44 can be a branch circuit breaker powered from the main circuit breaker.

First, at 46, the circuit breaker 44 is turned on. Then, an initNode( ) routine 47 (e.g., executed by the network communication processor 32 of FIG. 3) sets an initial self-address to 0xFF. Next, the processor 32 sends a reset request (RESET_REQ) message 48 to the aggregator 42 using the first transceiver interface 34 of FIG. 3, and sends another RESET_REQ message 50 in an effort to communicate with a downstream circuit breaker (which is not present in this example) using the second transceiver interface 36 of FIG. 3. Then, at 52, the network communication processor 32 executes a timer routine setTwoMinuteTimer( ) and, at 54, sets the mode to a reset mode (RESET_MODE). The RESET_MODE is entered at 56, and during this mode the number of network addresses are assigned. If the RESET message 58 is not timely received, then the RESET_REQ messages, such as 48,50, are re-sent on both of the interfaces (e.g., 34 and 36 of FIG. 3).

Next, in response to receiving the RESET_REQ message 48, the aggregator 42 sends a reset (RESET) message 58, and then waits for a reset acknowledge (RESET_ACK) message at 60. For the RESET message 58, from the aggregator 42, the aggregator 42 is, for example and without limitation, node 0 (address "0") in the system. In response to receiving the RESET message 58 including address "0", the circuit breaker 44 sends a reset acknowledge (RESET_ACK) message 62. In response to receiving the RESET_ACK message 62, the aggregator 42 stops waiting at 64. After sending the RESET_ACK message 62, the processor 32 executes a resetAddress( ) routine 66, which sets its unique self-address to one (=0+1) in this example, since the received RESET message 58 included the address "0" of the aggregator 42.

When the aggregator 42 sent the RESET message 58, a node that receives this message increments the address field (the address of the message) by one and sets its unique self-address to that incremented value. The node then forwards the RESET message further along expecting a RESET_ACK message from any adjacent downstream neighbor, which is further removed from the aggregator 42. In this example, the processor 32 forwards the RESET message 68 including the address "1" of the circuit breaker 44 using the second transceiver interface 36 of FIG. 3. Then, the processor 32 waits for a RESET_ACK message at 70.

If a node does not receive a RESET_ACK message, which is the case for the single circuit breaker 44 of this example, then it knows that it is the last node. After a predetermined time expires and there is no RESET_ACK message, the processor 32 executes a setMode(NORMAL_MODE) routine 72, which sets the NORMAL_MODE at 76. The processor 32 also sends a reset confirm (RESET_CONFIRM) message 74 to the aggregator 42 using the first transceiver interface 34 of FIG. 3. After the aggregator 42 receives the RESET_CONFIRM message 74, it enters the NORMAL_MODE at 78, which means that all of the number of unique addresses have been assigned and the aggregator 42 and the number of circuit breakers 44,45 are ready for network communication using such number of unique addresses.

At 68, each node need not rely on receiving a RESET_ACK message to the first forwarded RESET message 68 and can retry that RESET message 68 a predetermined number of times before it concludes that it is the last node in the linear array and sends back the RESET_CONFIRM message 74 to the aggregator 42. The forwarded RESET message 68 confirms whether there is nothing downstream of the circuit breaker 44. A RESET_ACK message, at 70, is discussed, below, in connection with FIGS. 5A-5B. The forwarded RESET message 68 has two functions: (1) to inform all nodes in the network to take an address based on their placement relative to the aggregator 42 (based on the address that they receive); and (2) to allow the last node in the linear array to determine that it is indeed the last node, after a repeated predetermined number of forwarded RESET messages 68, as sent one after another, fail to elicit a RESET_ACK message from its (non-existent) downstream neighbor, in order that it can initiate the reverse/upstream RESET_CONFIRM message 74.

On the other hand, as will be discussed in connection with FIGS. 5A-5B, if a RESET_ACK message is received at 70, then the node knows not to initiate the RESET_CONFIRM message 74, but rather to wait for a RESET_CONFIRM message to be received from its downstream neighbor (from the second transceiver interface 36 of FIG. 3 opposite to the first transceiver interface 34 that received the RESET message 58). This happens for the circuit breaker 44 in the example of FIGS. 5A-5B.

It will be appreciated that the addressing mechanism of assigning addresses becomes scalable to any number of nodes arranged in a linear fashion.

The normal input condition is that the aggregator 42 is turned on before the first circuit breaker 44. If there is no aggregator 42 in the network, then the nodes will periodically (e.g., forever) keep timing out the setTwoMinuteTimer( ) routine at 52, and once again keep retransmitting the RESET_REQ messages 48,50. Only the aggregator 42 has the power to act as a network administrator, so only the aggregator 42 can send the RESET message 58 that allows nodes to take addresses for themselves (by definition, there can only be one aggregator per load panel network). However, by design, the onus of requesting an address (effectively requesting network re-formation) lies on the nodes and not the aggregator 42. This ensures that even if an installer adds a circuit breaker to the load panel while it is hot (i.e., never turned off at the main circuit breaker, which can be the aggregator 42), then a new node that shows up on the network is persistent in sending its RESET_REQ messages, such as 48,50, until it receives the RESET message 58, the forwarded RESET message 68, or a subsequently forwarded RESET message (not shown) and is able to assign itself a unique network address.

The aggregator 42 can be, for example and without limitation, a main circuit breaker of the load panel 6 of FIG. 1, in order that power cycling the aggregator 42 would automatically power cycle the other branch circuit breakers 2. This means that when booted up, the aggregator 42 will receive at least one RESET_REQ message, such as 48, and will respond by initiating the propagation of a RESET message, such as 58, downstream, and the RESET_CONFIRM message, such as 74, upstream back to the aggregator 42.

Alternatively, the aggregator 42 can lie separately from the main circuit breaker, either as a module on top of a circuit breaker stack or at the bottom of the circuit breaker stack. In the case when power is cycled only to the aggregator 42, it re-boots and has no knowledge of the existing circuit breakers 2. Now, when the nodes that are in the NORMAL_MODE 76 (e.g., power was not cycled to those nodes) are unable to communicate with the aggregator 42 after an extended period of time, they will send a DATA_FAIL message (not shown) back to the aggregator 42. This allows the aggregator 42 to once again initiate a RESET message, such as 58.

The address of the aggregator 42 is, for example and without limitation, hard coded to address zero. This is where the network formation takes into account a single stack/column of circuit breakers.

Alternatively, miniature circuit breaker panels or molded case circuit breaker panels often have two vertically stacked columns of circuit breakers. In one example embodiment, the aggregator 42 has two optical (e.g., without limitation, infrared) ports (e.g., the two interfaces 16,18 of the aggregator 8 of FIG. 2) looking into both columns of circuit breakers (e.g., a first column including the circuit breaker 10 and a second column including the circuit breaker 20 of FIG. 2). The aggregator 42 may use, for example and without limitation, an address of 0 in one column, and an address of 1 in the other column. Each node may then decide to increment the address in the RESET message 58 by two before assigning a unique address and to decrement the address in the RESET_CONFIRM message 74 by two before verifying its unique address. In such a scenario, one column would have a series of odd numbers as addresses (e.g., without limitation, 1 (aggregator), 3, 5, 7 . . . ) and the other column would have a series of even numbers as addresses (e.g., without limitation, 0 (aggregator), 2, 4, 6 . . . ). This approach would lead to an address allocation that would allow for every node in the load panel to have a unique address number.

EXAMPLE 2

Figure 5A:
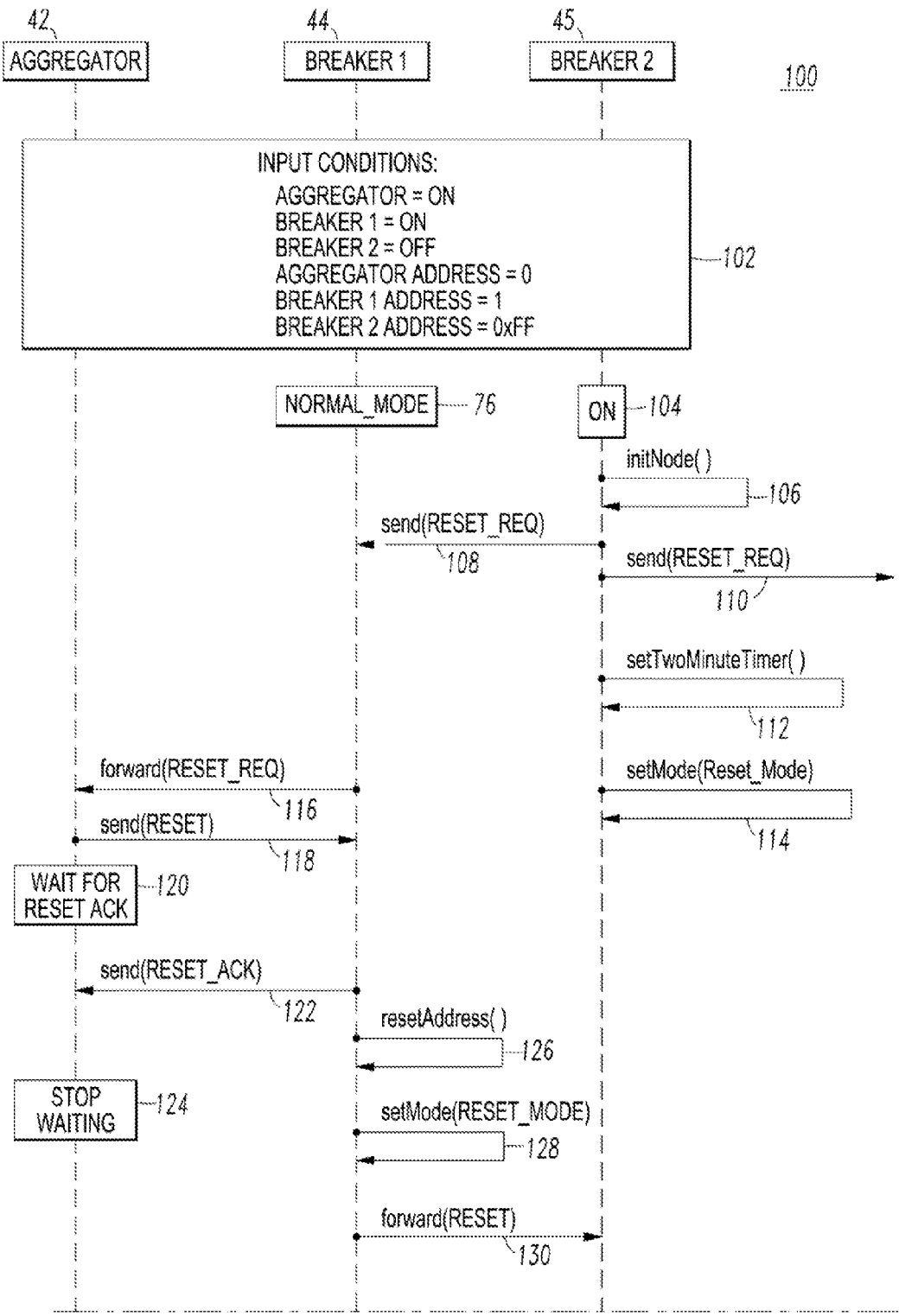
FIGS. 5A-5B form a communication sequence diagram of an example configuration including the aggregator and two of the circuit breakers of FIG. 1.
Figure 5B:
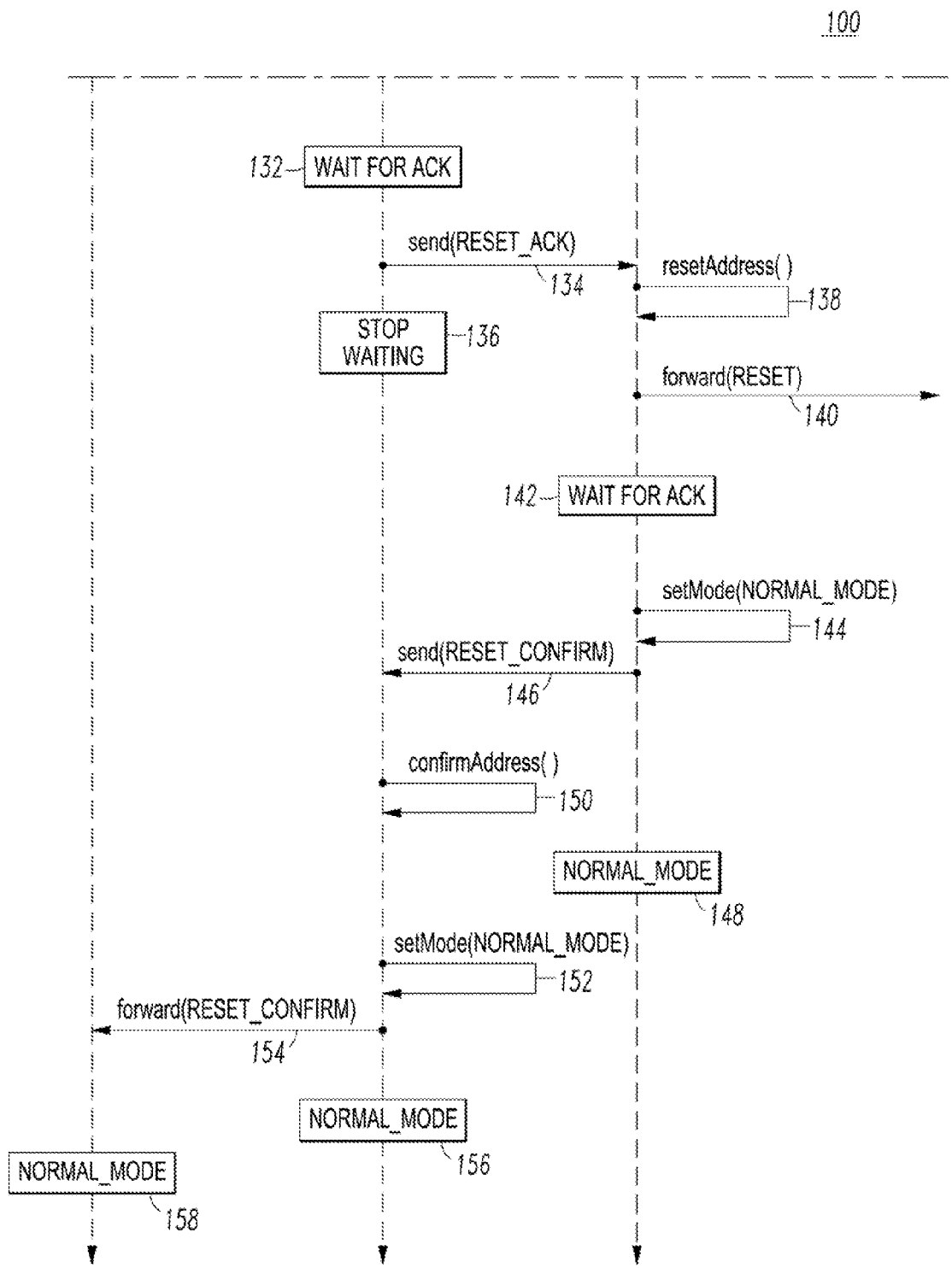

FIGS. 5A-5B show a sequence diagram 100 of an example configuration including the aggregator 42 and two circuit breakers 44,45. The input conditions 102 for this example are based upon the example of FIG. 4. At 102, the aggregator 42 and the first circuit breaker 44 are both on, the second circuit breaker 45 is off, the aggregator 42 is address "0", the first circuit breaker 44 is address "1", and the second circuit breaker will initially be assigned the default address 0xFF at 106, after it is turned on at 104.

In this example, the first circuit breaker 44 does not use a timer since the initial condition is that it is already in the NORMAL_MODE at 76. So the network had already been established between only the first circuit breaker 44 and the aggregator 42, at 102, and the second circuit breaker 45 will be added incrementally to the load panel. If, however, the first circuit breaker 44 had just booted up and therefore was looking to form a network, then it would have used its timer.

Now if both of the first and the second circuit breakers 44,45 were added to the load panel, and then the main circuit breaker (e.g., without limitation, the aggregator 42) was turned on, then they would both boot up at the same time, set their timers and send RESET_REQ messages, such as 108,110, on both of their interfaces (e.g., 34 and 36 of FIG. 3). Next, at 112, the network communication processor 32 executes a timer routine setTwoMinuteTimer( ) and, at 114, sets the mode to a reset mode (RESET_MODE). During the RESET_MODE, the number of network addresses are assigned. If the RESET message 130 is not timely received, then the RESET_REQ messages, such as 108,110, are re-sent on both of the interfaces (e.g., 34 and 36 of FIG. 3).

In the example of FIGS. 5A-5B, the first circuit breaker 44 receives the RESET_REQ message 108 from the second circuit breaker 45. In response, it forwards the RESET_REQ message 116 to the aggregator 42. In response to receiving the RESET_REQ message 116, the aggregator 42 sends a RESET message 118, and then waits for a RESET_ACK message at 120. For the RESET message 118, from the aggregator 42, the aggregator 42 is, for example and without limitation, node 0 (address "0") in the system. In response to receiving the RESET message 118 including address "0", the circuit breaker 44 sends a RESET_ACK message 122. In response to receiving the RESET_ACK message 122, the aggregator 42 stops waiting at 124.

After sending the RESET_ACK message 122, the processor 32 executes a resetAddress( ) routine 126, which sets its unique self-address to one in this example, since the received RESET message 118 included the address "0" of the aggregator 42. Then, the processor 32 executes a setMode(RESET_MODE) routine 128, which causes it to enter the RESET MODE and then to forward the RESET message 130. In this example, the processor 32 forwards the RESET message 130 including the address "1" of the circuit breaker 44 using the second transceiver interface 36 of FIG. 3. Then, the processor 32 waits for a RESET_ACK message at 132. In response to receiving the forwarded RESET message 130 including the address "1" of the circuit breaker 44, the processor 32 of the second circuit breaker 45 sends the RESET_ACK message 134 back to the first circuit breaker 44 using the first transceiver interface 34 of FIG. 3. In response to receiving the RESET_ACK message 134, the first circuit breaker 44 stops waiting at 136.

After sending the RESET_ACK message 134, the processor 32 of the second circuit breaker 45 executes a resetAddress( ) routine 138, which sets its unique self-address to two in this example, since the received forwarded RESET message 130 included the address "1" of the first circuit breaker 44. The second circuit breaker 45 then forwards the RESET message 140 further along expecting a RESET_ACK message from any adjacent downstream neighbor (however, there is none in this example), which is further removed from the aggregator 42. In this example, the processor 32 forwards the RESET message 140 including the address "2" of the second circuit breaker 45 using the second transceiver interface 36 of FIG. 3. Then, the processor 32 waits for a RESET_ACK message at 142.

If the second circuit breaker 45 does not receive a RESET_ACK message, which is the case for this example, then it knows that it is the last node. After a predetermined time expires and there is no RESET_ACK message, the processor 32 of the second circuit breaker 45 executes a setMode(NORMAL_MODE) routine 144, which causes it to enter the NORMAL_MODE at 148 and to send the RESET_CONFIRM message 146. In this example, the processor 32 sends the RESET_CONFIRM message 146 including the address "2" of the second circuit breaker 45 using the first transceiver interface 34 of FIG. 3. Then, the processor 32 of the second circuit breaker 45 enters the NORMAL_MODE at 148.

After receiving the RESET_CONFIRM message 146, the processor 32 of the first circuit breaker 44 executes a confirmAddress( ) routine 150, which confirms that the address "2" of the RESET_CONFIRM message 146 decremented by one is the unique address "1" of the first circuit breaker 44 as was determined at 126. Then, the processor 32 of the first circuit breaker 44 executes a setMode(NORMAL_MODE) routine 152, which causes it to send the RESET_CONFIRM message 154. In this example, the processor 32 sends the RESET_CONFIRM message 154 including the address "1" of the first circuit breaker 44 using the first transceiver interface 34 of FIG. 3. Then, the processor 32 of the first circuit breaker 44 enters the NORMAL_MODE at 156. Finally, after receiving the RESET_CONFIRM message 154, the aggregator 42 enters the NORMAL_MODE at 158.

For the example where both of the first and the second circuit breakers 44,45 were added to or re-booted in the load panel, after 76, if the first circuit breaker 44 had already sent off its RESET_REQ message (not shown, but see the RESET_REQ message 48 of FIG. 4) upstream by then, it would ignore/suppress the RESET_REQ message 108 from the second circuit breaker 45 (since its view is that it has sent a RESET_REQ message in that direction already and an additional message also directed at the aggregator 42 for the same purpose is redundant), if not, then it forwards the RESET_REQ message 108 from the second circuit breaker 45 upstream, as shown. In the downstream direction, the behavior of the second circuit breaker 45 on receiving a RESET_REQ message (not shown) from the first circuit breaker 44 is very similar.

The upstream RESET_CONFIRM message, such as 146, is basically a confirmation to each node that a "bi-directional" path exists between itself and its neighbors on both sides (if they exist). Looking at each node individually, for a node, such as the first circuit breaker 44, to conclude that its role in address assignment is complete, in order that it can move from the RESET_MODE (as entered at 128) to the NORMAL_MODE 156, it has: (1) received the RESET message 118 as a downstream neighbor; (2) forwarded the RESET message 130 as an upstream neighbor (to its downstream neighbor, which is the example second circuit breaker 45 of FIGS. 5A-5B); (3) subsequently, received the RESET_CONFIRM message 146 as an upstream neighbor; and (4) forwarded the RESET_CONFIRM message 154 as a downstream neighbor to its upstream neighbor, which is the aggregator 42. Thus, transmission and reception on both interfaces (e.g., 34 and 36 of FIG. 3) have been checked. Also, the node has made sure that the initial address that it took for itself at 126 in the downstream propagation is the same as the address that it would have taken for itself in the upstream propagation at 150. This action is captured in the confirmAddress( ) routine 150, where, once the node receives the RESET_CONFIRM message 146 from a downstream neighbor, it checks that its unique self-address equals the address in the RESET_CONFIRM message 146 minus one. After this action, it decrements the address in the RESET_CONFIRM message 146 by one, and forwards the RESET_CONFIRM message 154, with the address "1" in this example, upstream.

The disclosed concept provides an addressing mechanism without requiring non-volatile memory, fixed-at-factory identifiers, factory programming of addresses, or routing tables.

EXAMPLE 3

Although the disclosed concept assumes that the same communication mechanism(s) are employed for data communication and for identifying unit ordering for unique addressing, that is not required. For example, data communication can be accomplished over any suitable wired or wireless communication channel or bus separate from the disclosed communication mechanism(s). For example and without limitation, relatively inexpensive optics can be employed for auto-chaining and unique addressing employing the disclosed communication mechanism(s), while meaningful data-passing can be accomplished using a number of communication channels or busses with relatively higher bandwidth (e.g., without limitation, relatively short range wireless; an optical bus; a hard-wired bus).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A load panel comprising:
   an enclosure;
   an aggregator component including a first processor and a number of communicating mechanisms, said first processor including a first routine structured to communicate using said number of communicating mechanisms; and
   a number of electrical switching apparatus, each of said number of electrical switching apparatus including a second processor, a first communicating mechanism and a second communicating mechanism, said aggregator component and said number of electrical switching apparatus being arranged as a linear structure within said load panel, said second processor including a second routine structured to communicate using said first and second communicating mechanisms and to assign a unique address to a corresponding one of said number of electrical switching apparatus with respect to said aggregator component and any remaining number of said number of electrical switching apparatus, said first communicating mechanism communicating with or toward said aggregator component, said second communicating mechanism communicating with at most one of said any remaining number of said number of electrical switching apparatus,
   wherein said first and second routines are structured to cooperate to re-assign said unique address it said corresponding one of said number of electrical switching apparatus is added in the linear structure between said aggregator component and said corresponding one of said number of electrical switching apparatus, and wherein said unique address denotes position of said corresponding one of said number of electrical switching apparatus in the linear structure.

2. The load panel of claim 1 wherein said number of communicating mechanisms, said first communicating mechanism and said second communicating mechanism are optical communicating mechanisms.

3. The load panel of claim 1 wherein said unique address is a unique integer number.

4. The load panel of claim 1 wherein said first and second routines are structured to function without using a non-volatile memory.

5. The load panel of claim 1 wherein said first and second routines are structured to cooperate to re-assign said unique address if said corresponding one of said number of electrical switching apparatus is removed or replaced in the linear structure.

6. The load panel of claim 1 wherein said first and second routines are structured to function without user involvement.

7. The load panel of claim 1 wherein said number of communicating mechanisms of said aggregator component includes two interfaces to communicate with two independent linear structures of electrical switching apparatus.

8. The load panel of claim 1 wherein after installation and startup of said corresponding one of said number of electrical switching apparatus in the linear structure, said second routine initially assigns said corresponding one of said number of electrical switching apparatus a default network address of 0xFF.

9. The toad panel of claim 1 wherein said corresponding one of said number of electrical switching apparatus saves said unique address until said corresponding one of said number of electrical switching apparatus is powered off; and wherein after power up of said corresponding one of said number of electrical switching apparatus, said second routine is further structured to communicate using said first and second communicating mechanisms and to re-assign a unique address to said corresponding one of said number of electrical switching apparatus with respect to said aggregator component and any remaining number of said number of electrical switching apparatus.

10. The load panel of claim 1 wherein said aggregator component is a main circuit breaker; and wherein said number of electrical switching apparatus are a plurality of branch circuit breakers powered through said main circuit breaker.

11. The load panel of claim 1 wherein said number of electrical switching apparatus are a main circuit breaker and a plurality of branch circuit breakers powered through said main circuit breaker; and wherein said aggregator component is separate from said main circuit breaker.

12. The load panel of claim 11 wherein said linear structure includes a top and a bottom; and wherein said aggregator component is a module on the top of the linear structure or at the bottom of the linear structure.

13. A load panel comprising:
an enclosure;
an aggregator component including a first processor and a number of communicate mechanisms, said first processor including a first routine structured to communicate using said number of communicating mechanisms; and
a number of electrical switching apparatus, each of said number of electrical switching apparatus including a second processor, a first communicating mechanism and a second communicating mechanism, said aggregator component and said number of electrical switching apparatus being arranged as a linear structure within said load panel, said second processor including a second routine structured to communicate using said first and second communicating mechanisms and to assign a unique address to a corresponding one of said number of electrical switching apparatus with respect to said aggregator component and any remaining number of said number of electrical switching apparatus, said first communicating mechanism communicating with or toward said component, said second communicating mechanism communicating with at most one of said any remaining number of said number of electrical switching apparatus, and wherein said unique address is a network address; and wherein after power up of said aggregator component, said first routine assigns said aggregator component a unique network address of zero.

14. The load panel of claim 13 wherein after said first routine assigns said aggregator component the unique network address of zero, said first routine communicates a reset message including an address of zero using said number of communicating mechanisms; wherein said second routine of one of said number of electrical switching apparatus receives the reset message from one of the first and second communicating mechanisms and responsively increments the last said address by one and sets the unique address of said one of said number of electrical switching apparatus to the incremented address; and wherein said second routine of said one of said number of electrical switching apparatus forwards the reset message including the incremented address from the other one of the first and second communicating mechanisms and awaits a reset acknowledge message from an adjacent downstream electrical switching apparatus, which is further removed from the aggregator component.

15. The load panel of claim 14 wherein if said second routine of said one of said number of electrical switching apparatus does not receive the reset acknowledge message, then said second routine sends a reset confirm message back to the aggregator component from said one of the first and second communicating mechanisms.

16. The load panel of claim 14 wherein if said second routine of said one of said number of electrical switching apparatus does receive the reset acknowledge message within a predetermined time period, then said second routine awaits receipt of a reset confirm message including an address of the adjacent downstream electrical switching, apparatus on the other one of the first and second communicating mechanisms.

17. The load panel of claim 16 wherein said second routine of said one of said number of electrical switching apparatus is further structured to transition from a reset mode to a normal mode after: receiving the reset message from one of the first and second communicating mechanisms; forwarding the reset message including the incremented address from the other one of the first and second communicating mechanisms; receiving the reset confirm message from the adjacent downstream electrical switching apparatus on the other one of the first and second communicating mechanisms; and forwarding the reset confirm message as a downstream electrical switching apparatus of said aggregating component from the one of the first and second communicating mechanisms.

18. The load panel of claim 17 wherein said second routine of said one of said number of electrical switching apparatus is further structured to confirm that said unique address is equal to the address of the received reset confirm message decremented by one.

19. The load panel of claim 17 wherein said second routine of said one of said number of electrical switching apparatus is further structured to forward the received reset confirm message having an address equal to the address of the received reset confirm message decremented by one.

20. The load panel of claim 14 wherein if said second routine of said one of said number of electrical switching apparatus does receive the reset message within a predetermined time period then said second routine sends a reset request message back to the aggregator component from said one of the first and second communicating mechanisms.

21. The load panel of claim 14 wherein said second routine enters a normal mode after assigning the unique address to the corresponding one of said number of electrical switching apparatus and before power is cycled to the corresponding one of said number of electrical switching apparatus; wherein if the corresponding one of said number of electrical switching apparatus is unable to communicate with the aggregator component after a predetermined period of time, then said second routine sends a data failure message back to the aggregator component from said one of the first and second communicating mechanisms; and wherein said first routine responsively communicates the reset message including the address of zero using said number of communicating mechanisms.

22. A load panel comprising;
an enclosure;
an aggregator component including a first processor and a member of communicating mechanisms, said first processor including a first routine structured to communicate using said number of communicating mechanisms; and
a number of electrical switching apparatus, each of said number of electrical switching apparatus including a second processor, a first communicating mechanism and a second communicating mechanism, said aggregator component and said number of electrical switching apparatus being arranged as a linear structure within said load panel, said second processor including a second routine structured to communicate using said first and second communicating mechanisms and to assign a unique address to a corresponding one of said number of electrical switching apparatus with respect to said aggregator component and any remaining number of said number of electrical switching apparatus, said first communicating mechanism communicating with or toward said aggregator component, said second communicating mechanism communicating with at most one of said any remaining number of said number of electrical switching apparatus, and
wherein if said second routine of said one of said number of electrical switching apparatus does not receive a reset message within a predetermined time period, then said second routine sends a reset request message from both of said first and second communicating mechanisms.

23. A load panel comprising:
an enclosure;
an aggregator component including a first processor and two communicating mechanisms, said first processor including a first routine structured to communicate using said two communicating mechanisms; and
a plurality of electrical switching apparatus, each of said electrical switching apparatus including a second processor, a first communicating mechanism and a second communicating mechanism, said aggregator component and said electrical switching apparatus being arranged as two linear structures within said load panel, said second processor including a second routine structured to communicate using said first and second communicating mechanisms and to assign a unique address to a corresponding one of said electrical switching apparatus with respect to said aggregator component and any remaining number of said electrical switching apparatus, said first communicating mechanism communicating with or toward said aggregator component, said second communicating mechanism communicating with at most one of said any remaining number of said electrical switching apparatus,
wherein said unique address is a network address; and
wherein after power up of said aggregator component said first routine assigns said aggregator component a unique network address of zero for the first one of said two linear structures and a unique network address of one for the second one of said two linear structures.

24. The load panel of claim 23 wherein said two linear structures are two vertically stacked columns of a number of said electrical switching apparatus; wherein a first one of said two communicating mechanisms communicates into a first one of said two linear structures; and wherein a second one of said two communicating mechanisms communicates into a second one of said two linear structures.

25. The load panel of claim 24 wherein after said first routine assigns said aggregator component the unique network address of zero, said first routine communicates a reset message including an address of zero using the first one of said two communicating mechanisms; wherein said second routine of one of said electrical switching apparatus receives the reset message from the first one of said two communicating mechanisms and responsively increments the address of the received reset message by two and sets the unique address of said one of said electrical switching apparatus to the incremented address; wherein said second routine of said one of said electrical switching apparatus forwards the reset message including the incremented address from the first one of said two communicating mechanisms and awaits a reset acknowledge message from an adjacent downstream circuit breaker of the first one of said two linear structures; wherein after said first routine assigns said aggregator component the unique network address of one, said first routine communicates a reset message including an address of one using the second one of said two communicating mechanisms; wherein said second routine of another one of said electrical switching apparatus receives the last said reset message from the second one of said two communicating mechanisms and responsively increments the address of the last said received reset message by two and sets the unique address of said another one of said electrical switching apparatus to the last said incremented address; and wherein said second routine of said another one of said electrical switching apparatus forwards the last said reset message including the last said incremented address from the second one of said two communicating mechanisms and awaits a reset acknowledge message from an adjacent downstream circuit breaker of the second one of said two linear structures.

* * * * *